United States Patent [19]

Natarajan et al.

[11] Patent Number: 5,749,044
[45] Date of Patent: May 5, 1998

[54] CENTRALIZED DYNAMIC CHANNEL ASSIGNMENT CONTROLLER AND METHODS

[75] Inventors: Kadathur S. Natarajan, Mesa; Yih G. Jan; Kenneth M. Peterson, both of Phoenix, all of Ariz.

[73] Assignee: Motorola, Inc., Schaumburg, Ill.

[21] Appl. No.: 502,793

[22] Filed: Jul. 14, 1995

[51] Int. Cl.⁶ .................. H04R 7/185; H04R 7/19; H04R 7/195
[52] U.S. Cl. .................. 455/13.1; 455/12.1
[58] Field of Search .................. 455/12.1, 13.1, 455/13.2, 33.1, 34.2, 62, 63, 34.1, 33.2, 3.2, 4.1, 427, 429, 430

[56] References Cited

U.S. PATENT DOCUMENTS

| | | | |
|---|---|---|---|
| 5,287,544 | 2/1994 | Menich et al. | 455/62 |
| 5,483,664 | 1/1996 | Moritz et al. | 455/33.2 |
| 5,574,969 | 11/1996 | Olds et al. | 455/33.4 |
| 5,574,973 | 11/1996 | Borth et al. | 379/59 |
| 5,574,974 | 11/1996 | Almgren et al. | 455/34.1 |
| 5,594,941 | 1/1997 | Dent | 455/13.4 |

*Primary Examiner*—Reinhard J. Eisenzopf
*Assistant Examiner*—Gertrude Arthur
*Attorney, Agent, or Firm*—Harold C. McGurk

[57] ABSTRACT

A central controller (40) executes a method (100) that selects and assigns channels to serve mobile subscriber units (30) in a space-based mobile telecommunication system (10). The method (100) is based on simultaneous consideration of a number of criteria that affect overall system performance of the mobile telecommunication system. Another method (200) assigns serving cells (15–18) by matching the available channel resources with actual caller demand as a function of time. The methods (100, 200) may be used in systems where the actual demand (i.e., offered subscriber traffic) and the number of channels available in each cell (15–18) is varying over time.

20 Claims, 3 Drawing Sheets

5,749,044

CENTRALIZED DYNAMIC CHANNEL ASSIGNMENT CONTROLLER AND METHODS

TECHNICAL FIELD

This invention relates generally to mobile telecommunication systems and, in particular, to a central controller and methods for performing dynamic selection and near real-time assignment of channel resources to subscriber units in a space-based mobile telecommunication system.

BACKGROUND OF THE INVENTION

Satellite cellular systems that assign channels to subscriber units without considering the instantaneous load on the system are limited from making the most effective use of local access bandwidth. A certain amount of resources is pre-allocated for each cell at each time interval based on expected traffic. However, because of the stochastic nature of offered traffic, the static approaches may lead to either resource wastage or shortage or both.

In conventional static channel assignment methods, bandwidth wastage occurs when actual channel or caller demand falls short of the pre-allocated amount. Calls could be better allocated to satellites which are experiencing less than expected caller demand (i.e., under-utilized base stations). In the alternative, bandwidth shortage may occur resulting in blocked and dropped calls when the actual channel demand exceeds the pre-allocated amount. These disadvantages, bandwidth wastage and shortage, are just a few of the problems associated with conventional static channel allocation methods when based on static or historic caller demands rather than actual traffic demands. Accordingly, there is a significant need for a dynamic channel allocation method and system that takes into account the state of the telecommunication system when cell and channels assignment decisions are made.

DETAILED DESCRIPTION OF THE PREFERRED EMBODIMENTS

The present invention describes a general method for assignment and dynamic selection of channels to service mobile subscriber units in a space-based telecommunication system. The present invention has utility in enabling a telecommunication system to be more responsive to actual traffic demand conditions by matching demand with available channel resources as a function of time. The present invention is "dynamic" because the state of the telecommunication system is considered in deciding how channel resources are assigned to meet the actual traffic demand. The invention is "centralized" because all pertinent state information is resident in a central controller which is responsible for making the channel assignment decisions. State information may be computed at the central controller, transmitted by the subscriber units to the central controller or a combination thereof.

A "satellite" as used throughout this description means a man-made object or vehicle intended to orbit the earth. A "satellite" comprises geostationary, low-earth and medium-earth orbiting satellites and/or combinations thereof. A "constellation" means a number of satellites arranged in orbits for providing specified coverage (e.g., radio communication, remote sensing, etc.) of a portion, portions or all of earth. A constellation typically includes multiple rings (or planes) of satellites and may have an equal number of satellites in each plane, although this is not essential.

Figure 1:
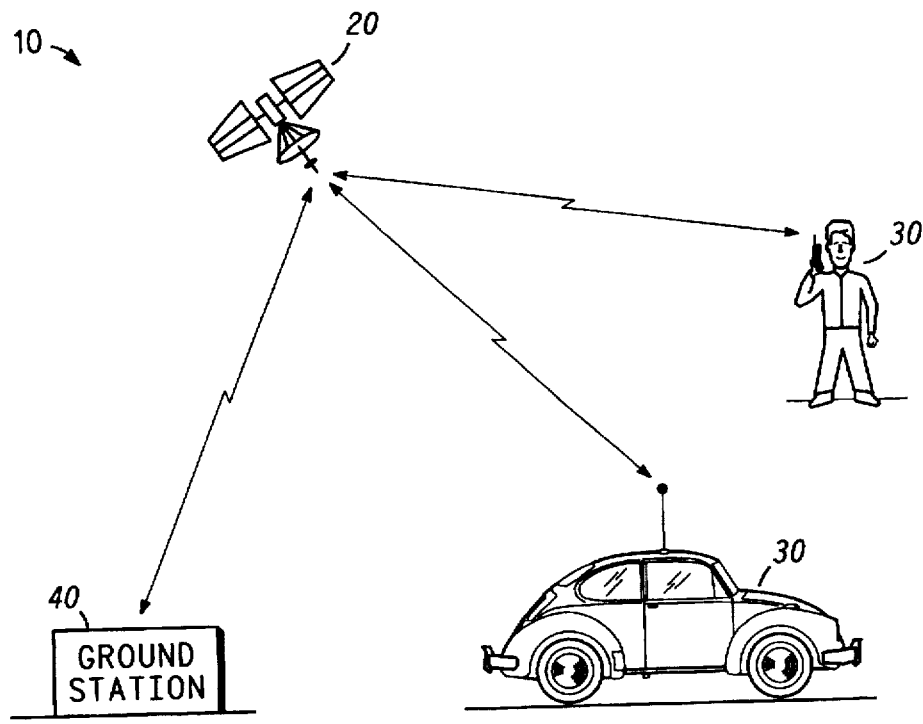
FIG. 1 shows in general a mobile telecommunication system.

FIG. 1 shows a general view of space-based telecommunication system 10 according to a preferred embodiment of the present invention. Although FIG. 1 illustrates a highly simplified diagram of mobile telecommunication system 10, system 10 comprises at least one satellite 20, any number of subscriber units 30 and at least one ground station 40 which includes a central controller. Generally, communication system 10 may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public service telephone networks (PSTNs) and/or conventional terrestrial communication devices coupled to a PSTN through conventional terrestrial base stations.

The present invention is applicable to mobile telecommunication systems 10 having at least one satellite 20 in low-earth, medium-earth or geosynchronous orbit. Satellite 20 is preferably a satellite in low-earth orbit around earth. Satellite 20 may be a single satellite or one of many satellites in a constellation of satellites orbiting earth, like the IRIDIUM® system. Satellite 20 communicates with other nearby or adjacent satellites 20 through cross-links. The present invention is also applicable to telecommunication systems 10 having satellites 20 which orbit earth at any angle of inclination including polar, equatorial or another orbital pattern. The present invention is applicable to systems 10 where full coverage of the earth is not achieved (i.e., where there are "holes" in the telecommunication coverage provided by the constellation) and to systems 10 where plural coverage of portions of the earth occur (i.e., more than one satellite is in view of a particular point on earth's surface).

Each satellite 20 communicates with other nearby base stations through a cross-link. These cross-links form a backbone of mobile telecommunication system 10. Thus, a call or communication from one subscriber unit located at any point on or near the surface of the earth may be routed through a satellite or a constellation of satellites to within range of substantially any other point on the surface of the earth. A communication may be routed down to a subscriber unit (which is receiving the call) on or near the surface of the earth from another satellite 20. How satellite 20 physically communicates (e.g., spread spectrum technology) with subscriber units 30 and ground station 40 is well known to those of ordinary skill in the art.

Subscriber units 30 may be located anywhere on the surface of earth or in the atmosphere above earth. Mobile telecommunication system 10 may accommodate any number of subscriber units 30. Subscriber units 30 are preferably communication devices capable of receiving voice and/or data from satellites 20 and/or ground station 40. By way of example, subscriber units 30 may be hand-held, portable telephone adapted to transmit to and receive transmissions from satellites 20 and/or ground station 40.

How subscriber units 30 physically transmit voice and/or data to and receive voice and/or data from satellites 20 is well known to those of ordinary skill in the art. In the preferred embodiment of the present invention, subscriber units 30 communicate with satellite 20 using a limited portion of the electromagnetic spectrum that is divided into numerous channels. The channels are preferably combinations of L-Band and/or K-Band frequency channels but may encompass Frequency Division Multiple Access (FDMA) and/or Time Division Multiple Access (TDMA) and/or Code Division Multiple Access (CDMA) communication or any combination thereof. Other methods may be used as known to those of ordinary skill in the art.

Ground station communicates with and controls satellite 20. There may be multiple ground stations 40 located at different regions on earth. For example, there may be one ground station 40 located in Hawaii, another located in the Los Angeles area and another in the Washington, D.C. area. Another example is to have separate ground station 40 located in each country on earth.

Ground station 40 provides satellite control commands to satellite 20 so that it maintains its proper position in its orbit and performs other house-keeping tasks. Ground station 40 is additionally responsible for receiving voice and/or data from satellite 20. How ground station 40 physically communicates (e.g., spread spectrum) with satellites 20 and/or subscriber units 30 is well known to those of ordinary skill in the art.

Figure 2:
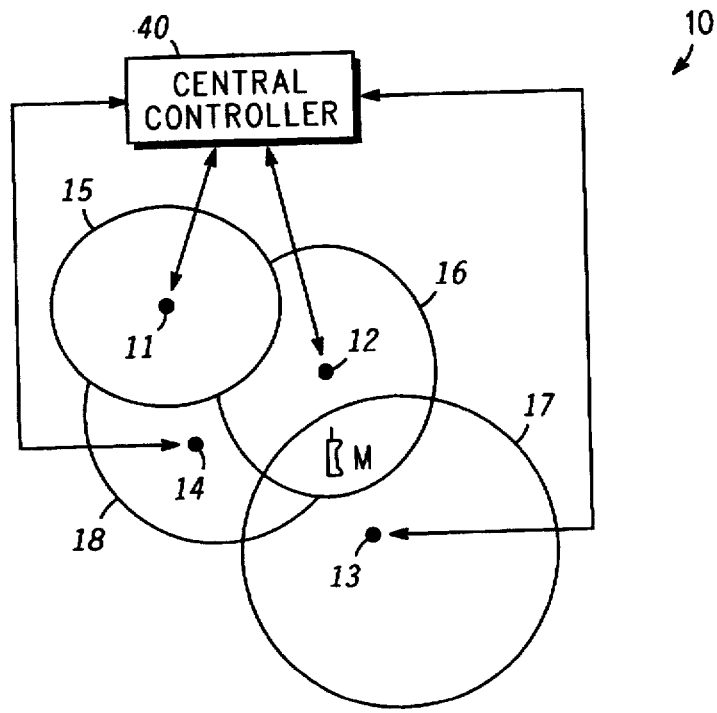
FIG. 2 shows an example of four cells and a central controller.

FIG. 2 shows an example of four cells and a central controller. A subscriber gains access to the network or system 10 via one of the nodes 11, 12, 13, 14 (e.g., satellites). At any time instant, nodes 11–14 provide some type of radio frequency (RF) coverage, represented as cells or zones 15–19, respectively. Nodes 11 provides RF coverage for cell 15, node 12 provides RF coverage for cell 16, node 13 provides RF coverage for cell 17 and node 14 provides RF coverage for cell 18. Each cell 15–18 provides caller access to subscribers within their coverage area. The actual number of subscriber units that can be served simultaneously within cells 15–18 depends on the number of channels available. Nodes 11–14 may have a fixed number of channels available (independent of time) or a time-varying number of channels available.

For the purpose of providing complete coverage as well as increased accessibility, nodes 11–14 may provide overlapping RF coverage especially in geographic areas that have high demand for connectivity. The overlapping coverage areas is shown in FIG. 2 as that area where subscriber unit "M" is located. Those of ordinary skill in the art will understand that cells or antenna patterns generally represent regions where a signal level (for example, of the broadcast channel) associated with a cell is greater than some predetermined level, and outside that region, the signal level is less than the predetermined level. As shown in FIG. 2, subscriber unit "M" can be assigned a channel by nodes 12, 13 or 14. Although the shape of the cells or zones shown in FIG. 2 is elliptical or circular, the cell shape can be any shape for purposes of the present invention. Moreover, although each of the nodes projects one cell in FIG. 2, this invention is applicable to each of the nodes projecting multiple cells.

The number of local access channels available for simultaneous access by subscribers is limited. In order to handle a large number of users using a limited number of channels, it is important to use good channel management strategies and effectively utilize the available channels. The subscriber units initially determine which cell to communicate with based on the signal level or signal quality of a channel received at the subscriber unit. For example, a subscriber unit located within a center region of a cell or zone would most likely choose to communicate within that cell because the channel signal level of an antenna pattern is generally the greatest in the center region. If a subscriber unit is located within the region where two antenna patterns or cells overlap, the subscriber unit may choose either cell to communicate with because the channel signal levels are generally similar.

Central controller 40 shown in FIG. 2 is included in ground station 40 of FIG. 1. The central controller is responsible for first allocating cells and channels during a first process and dynamically selecting and assigning subscriber units to cells and channels during subsequent processes (e.g., handoff). Central controller may be for example, one or more computers which has multiple processors and enough memory for performing the required calculations and able to assign channels to potentially thousands of subscriber units in a relatively short time period of time (e.g., one second or less). The hardware of central controller 40 is well known to those of ordinary skill in the art. There may be multiple central controllers 40, each located in a separate ground station spread across earth.

Figure 3:
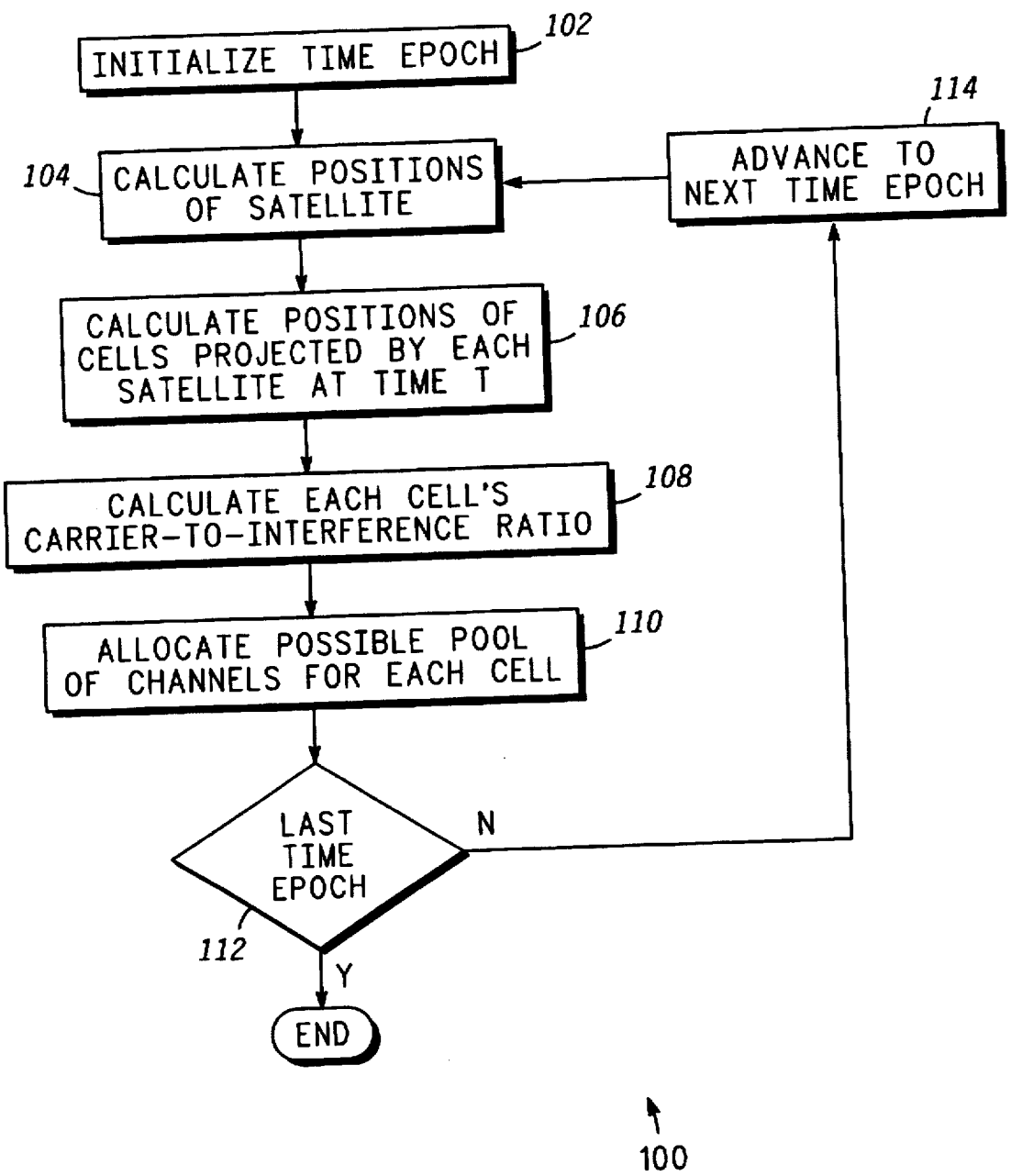
FIG. 3 shows a flowchart of a method for allocating cells and channels to subscriber units according to a preferred embodiment of the present invention.

FIG. 3 shows a flowchart of method 100 for allocating cells and channels to subscribers according to a preferred embodiment of the present invention. Method 100 is a software program that is executed by central controller 40 located inside ground station 40. Ground station 40 comprises the necessary computer hardware and architecture for executing method 100. The computer hardware is well known to those of ordinary skill in the art. Ground station 40 may execute other software programs for controlling the satellites and other functions that are unimportant to the present invention.

According to FIG. 3, central controller begins with a first time epoch in step 102. There may be multiple time epochs, each time epoch representing a time when the satellites and their corresponding cells are at a particular orbital position. Each time epoch may have the same or a different length of time. When central controller dynamically selects and assigns cells and channels to subscriber units requesting access to the telecommunication system 10 (FIG. 4), these time epochs are used to get the proper orientation of telecommunication system 10 relative to earth. Without knowing the current positions of satellites, central controller would be unable to select and assign the best cell and channel to service a channel request.

After step 102, central controller calculates in step 104 positions of each satellite in the space-based mobile telecommunication system using an orbit propagation model. An orbit propagation model is a software program for determining positions of satellites as a function of time as they orbit the earth. An orbit propagation model is commercially available from the North American Air Defense (NORAD) entitled Sattrack.

Central controller next calculates in step 106 positions of a number of cells projected by each satellite at time T. This calculation may be performed using the method described in U.S. Pat. No. 5,227,802 to Miki Runnion and Ken Peterson entitled "Description of Satellite System Cell Management".

Next, for each cell of each satellite, central controller calculates in step 108 a received carrier-to-interference (C/I)

ratio. In a satellite telecommunication system with a number of satellites and multiple cells per satellite, the interference relationship of cells with respect to each other is time-varying and depends on the position of the constellation at a given time. Time is considered as a sequence of small intervals. Within each interval, the inter-cell relationship stays fixed but may change from one interval to the next. As time progresses, the trajectories of the satellites are predictable and the locations of the cells projected by a satellite can be predetermined in each time interval (or epoch).

Central controller calculates the C/I ratio for each cell based on the following factors: the transmitting power of the serving cell and the interfering cell or cells, the antenna gain distribution of the serving cell and the interfering cell or cells, the receiving antenna gain distribution of the subscriber unit and the receiver filter characteristics of the subscriber unit. Additionally, the inter-modulation effects due to nonlinear amplifier characteristics, the Doppler frequency shift and the time delay offset between cells are also considered by the central controller in the C/I determination. From the C/I values, a possible pool of channel candidates is determined and assigned to this cell by central controller in step 110. Possible channel candidates for other cells can also be assigned. The assignment procedures may be based on methods described in U.S. Pat. No. 5,268,694 to Yih Jan and Ken Peterson, entitled "Communication System Employing Spectrum Reuse on a Spherical Surface."

After step 110, central controller determines in step 112 whether this was the last time epoch. If this is not the last time epoch, method 100 advances to the next time epoch in step 114 and repeats steps 104, 106, 108, 110 and 112 until the last epoch is reached. Once the last epoch is reached, method 100 executed by central controller ends.

Figure 4:
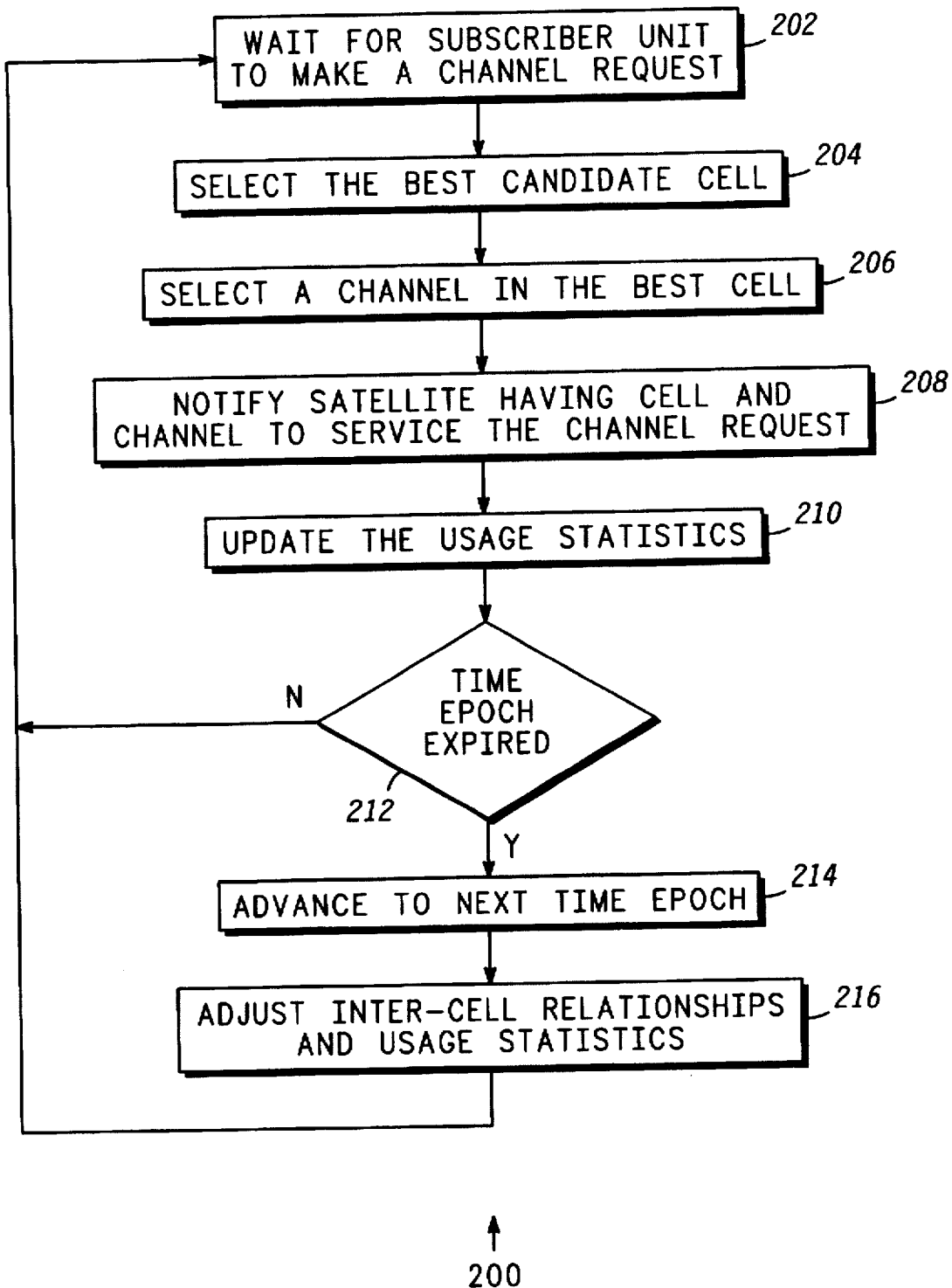
FIG. 4 shows a flowchart of a method for dynamically selecting the best cell and channel to handle a channel request according to a preferred embodiment of the present invention.

FIG. 4 shows a flowchart of a method for dynamically selecting the best cell and channel to handle a channel request according to a preferred embodiment of the present invention. According to FIG. 4, method 200 waits in step 202 until a subscriber unit transmits a channel request for a channel to a satellite that is within transmission range. The channel request comprises information about each candidate cell that can service the subscriber unit, including such information as the received broadcast power of each cell, the estimated cell time and the carrier-to-interference value. The channel request after arriving at the satellite is forwarded to the central controller.

The channel request may be due to a handoff request which is initiated by a subscriber unit. The handoff request may be one of the following three types: an intra-cell handoff, an inter-cell handoff and an inter-satellite handoff. An intra-cell handoff is a handoff from one channel of one cell to another channel within the same cell. An inter-cell handoff is a handoff from one channel of one cell to another channel of another cell within the same satellite. An inter-satellite handoff is a handoff from one channel of one cell in a satellite to another channel in another cell of another satellite. These types of handoffs are well known to those of ordinary skill in the art.

The central controller maintains all relevant information of each cell at each time epoch, including the following: (1) a cell's broadcasting power as received by individual users; (2) a calculated carrier-to-interference ratio or value; (3) an estimated duration that a subscriber unit will remain in a particular cell, (i.e., the estimated cell time); (4) a number of channels available in each cell; and 5) a number of channels assigned to each cell.

Based on the list of potential candidate cells that can service the channel request, central controller determines in step 204 the best cell for servicing the channel request. In the preferred embodiment, the central controller determines the best cell based on an evaluation of at least four criteria for each of the candidate cells. The criteria are: (1) a candidate cell's broadcast power received at the subscriber unit; (2) a candidate cell's carrier-to-interference value; (3) a candidate cell's channel availability in its channel pool; and (4) an estimated channel duration of the subscriber unit in a candidate cell. In the preferred embodiment, the four criteria listed above will be ranked as primary, secondary and tertiary factors in order of decreasing importance. The selection of the best cell to handle the channel request will first be based on a primary factor. If the choice is unique, the selection of the best cell is complete. If not, the secondary factor is considered next and if needed, the tertiary factors are considered until a candidate cell is determined to be the best cell to service the channel request.

In an alternative embodiment of deciding which of the candidate cells can best service the channel request, weighting factors may be associated with each of the four criteria. A final selection can be based on which cell has the maximum overall weight.

After the central controller finds the best cell, central controller in step 206 selects a channel from the possible channel pool of the best cell to service the channel request. The central control notifies in step 208 the satellite having the selected cell and channel to service the channel request. The satellite or node commences to establish communication with the subscriber unit that made the channel request using the selected channel and cell chosen by the central controller. Communication is established using technique well known to those of ordinary skill in the art.

Central controller next in step 210 updates the usage statistics of the cell that was chosen by incrementing the "number of the channels assigned" attribute associated with this particular cell.

Central controller determines in step 212 whether the current time epoch has expired. Every channel request occurs within a time epoch. Time epochs are predetermined and may last any time increment (e.g., 2 minutes, 5 minutes, or 10 minutes). Time epochs are important because the carrier-to-interference ratio values of each of the cells change as well as other inter-cell relationships and usage statistics. If the time epoch has not expired, central controller returns to step 202 to wait for a subscriber unit to make a channel request. If the time epoch has expired in step 212, central controller advances to the next time epoch in step 214 and adjusts in step 216 the inter-cell relationships and the usage statistics for each cell in the network. Central controller then returns to step 202 to wait for another channel request. This process continues indefinitely. Moreover, central controller is able to execute method 200 in parallel for every channel request received at the same time. In other words, central controller does not have to wait until it determines what cell and channel to use for one subscriber unit before selecting a cell and channel for another subscriber unit or units.

During an initial channel assignment or during a handoff process for a new channel allocation, the central controller will also consider load balances among cells so that a channel assigned to a subscriber unit may not come from a cell having the highest C/I value. Whenever a call is terminated by a subscriber unit, the central controller will free up the channel used by the subscriber unit (since it is no longer needed) and update the cell's usage statistics. Usage statistics of cells are updated in a similar manner after the handoff events occur.

It will be appreciated by those skilled in the art that the present invention dynamically selects and assigns cells to service mobile subscriber units in a space-based mobile telecommunication system. The dynamic channel assignment method performed by the central controller enables the telecommunication system to handle significantly more traffic than pure static channel assignment schemes. With the disclosed method, the load distribution is dynamically monitored by the central controller so that the traffic load is evenly distributed in the telecommunication system. The system capacity is effectively improved and the system performance maintained at an acceptable level.

Accordingly, it is intended by the appended claims to cover all modifications of the invention which fall within the true spirit and scope of the invention, including an applicability of the central controller and methods to terrestrial systems.

What is claimed is:

1. A method for allocating channels and cells of a plurality of satellites at each of a plurality of time epochs, the method comprising the steps of:
   a) calculating positions of each of the satellites at a time epoch;
   b) calculating positions of each of the cells for each satellite based on the positions of the satellites at the time epoch;
   c) calculating a carrier-to-interference value for each of the cells at the time epoch based on a transmitting power of a cell and interfering cells, antenna gain distribution of the cell and the interfering cells, receiving antenna gain distribution of a subscriber unit and receiver filter characteristics of the subscriber unit;
   d) allocating channels to each of the cells based on the carrier-to-interference value at the time epoch; and
   e) repeating steps (a)–(d) for each of the time epochs.

2. A method as recited in claim 1, wherein step (a) includes the step of calculating the positions of the satellites by using an orbit propagation model.

3. A method as recited in claim 1, wherein step (c) further includes the step of calculating the carrier-to-interference value additionally based on Doppler frequency shift and a time delay offset between calls.

4. A ground station for allocating channels and cells of a plurality of satellites at each of a plurality of time epochs, the ground station comprising:
   a central controller for calculating positions of each of the satellites at a plurality of time epochs, for calculating positions of each of the cells for each satellite based on the positions of the satellites at each of the time epochs, for calculating a carrier-to-interference value for each of the cells at each of the time epochs and for allocating channels to each of the cells based on the carrier-to-interference value at each of the time epochs based on a transmitting power of a cell and interfering cells, antenna gain distribution of the cell and the interfering cells, receiving antenna gain distribution of a subscriber unit and receiver filter characteristics of the subscriber unit; and
   satellite communication means for receiving channel requests from the satellites.

5. A method for dynamically selecting a candidate cell and a corresponding channel to handle a channel request made by a subscriber unit and received by a node, the method comprising the steps of:
   a) a central controller selecting the candidate cell having a best overall weight of four criteria from a plurality of candidate cells, the four criteria including broadcast power of each of the candidate cells, carrier-to-interference value of each of the candidate cells, channel availability of each of the candidate cells and an estimated channel duration of a subscriber unit in each of the candidate cells;
   b) the central controller selecting a channel from a plurality of channels in the candidate cell; and
   c) the central controller notifying the node of the candidate cell and the channel to service the channel request using the candidate cell and the channel.

6. A method as recited in claim 5, further comprising the step of the subscriber unit transmitting the channel request to the central controller.

7. A method as recited in claim 6, further comprising the step of the node receiving the channel request and relaying the channel request to the central controller.

8. A method as recited in claim 5, further comprising the step of the subscriber unit transmitting the channel request including information about each candidate cell that can service the channel request.

9. A method as recited in claim 8, wherein the step of transmitting the channel request further includes the step of sending to the node received broadcast power of each of the candidate cells, an estimated cell duration time of each of the candidate cells and a carrier-to-interference value of each of the candidate cells.

10. A method as recited in claim 5, further comprising the step of the subscriber unit transmitting the channel request for handing off communication from one channel to another channel.

11. A method as recited in claim 5, wherein step (a) includes the step of selecting one of the candidate cells having a highest ranking.

12. A method as recited in claim 11, wherein the selecting step includes the steps of:
   ranking each of the candidate cells in importance based on each of the candidate cells' broadcast power, a carrier-to-interference value, channel availability and estimated channel duration of a subscriber unit; and
   selecting the candidate cell having a higher degree of importance.

13. A method as recited in claim 11, wherein the selecting step includes the steps of:
   ranking each of the candidate cells as primary, secondary and tertiary factors based on each of the candidate cells' broadcast power, a carrier-to-interference value, channel availability and estimated channel duration of a subscriber unit; and
   selecting the candidate cell based on a unique primary factor.

14. A method as recited in claim 13, wherein the selecting step includes the step of choosing the candidate cell based on a unique secondary factor if the primary factors are not unique.

15. A method as recited in claim 14, wherein the selecting step includes the step of choosing the candidate cell based on a unique tertiary factor if the secondary factors are not unique.

16. A method as recited in claim 5, wherein step (a) includes the step of deciding which one of the candidate cells can best service the channel request based on broadcast power of each of the candidate cells, carrier-to-interference value of the candidate cells, channel availability of each of the candidate cells and estimated channel duration of a subscriber unit in each of the candidate cells.

17. A method as recited in claim 5, wherein step (c) includes the steps of:

the node receiving a message to service the channel request; and the node establishing communication with the subscriber unit using the candidate cell and the channel.

18. A method as recited in claim 5, further comprising the step of the central controller updating usage statistics for the node.

19. A method for dynamically selecting a candidate cell and a corresponding channel to handle a channel request made by a subscriber unit and received by a node, comprising the steps of:

a) a central controller selecting the candidate cell from a plurality of candidate cells;

b) the central controller selecting a channel from a plurality of channels in the candidate cell;

c) the central controller notifying the node of the candidate cell and the channel to service the channel request using the candidate cell and the channel;

d) determining whether a time epoch has expired;

e) adjusting inter-cell relationships and usage statistics if the time epoch has expired; and f) repeating steps (a)–(e) once another channel request has been received.

20. A ground station for assigning channels and cells of a plurality of nodes at each of a plurality of time epochs, the ground station comprising:

a central controller for receiving a channel request, for selecting a candidate cell having a best overall weight of four criteria from a plurality of candidate cells, the four criteria including broadcast power of each of the candidate cells, carrier-to-interference value of each of the candidate cells, channel availability of each of the candidate cells and an estimated channel duration of a subscriber unit in each of the candidate cells, for selecting a channel from a plurality of channels in the candidate cell and for notifying a node of the candidate cell and the channel to service the channel request using the candidate cell and the channel; and satellite communication means for receiving the channel request from the nodes.

* * * * *